United States Patent Office 3,429,797
Patented Feb. 25, 1969

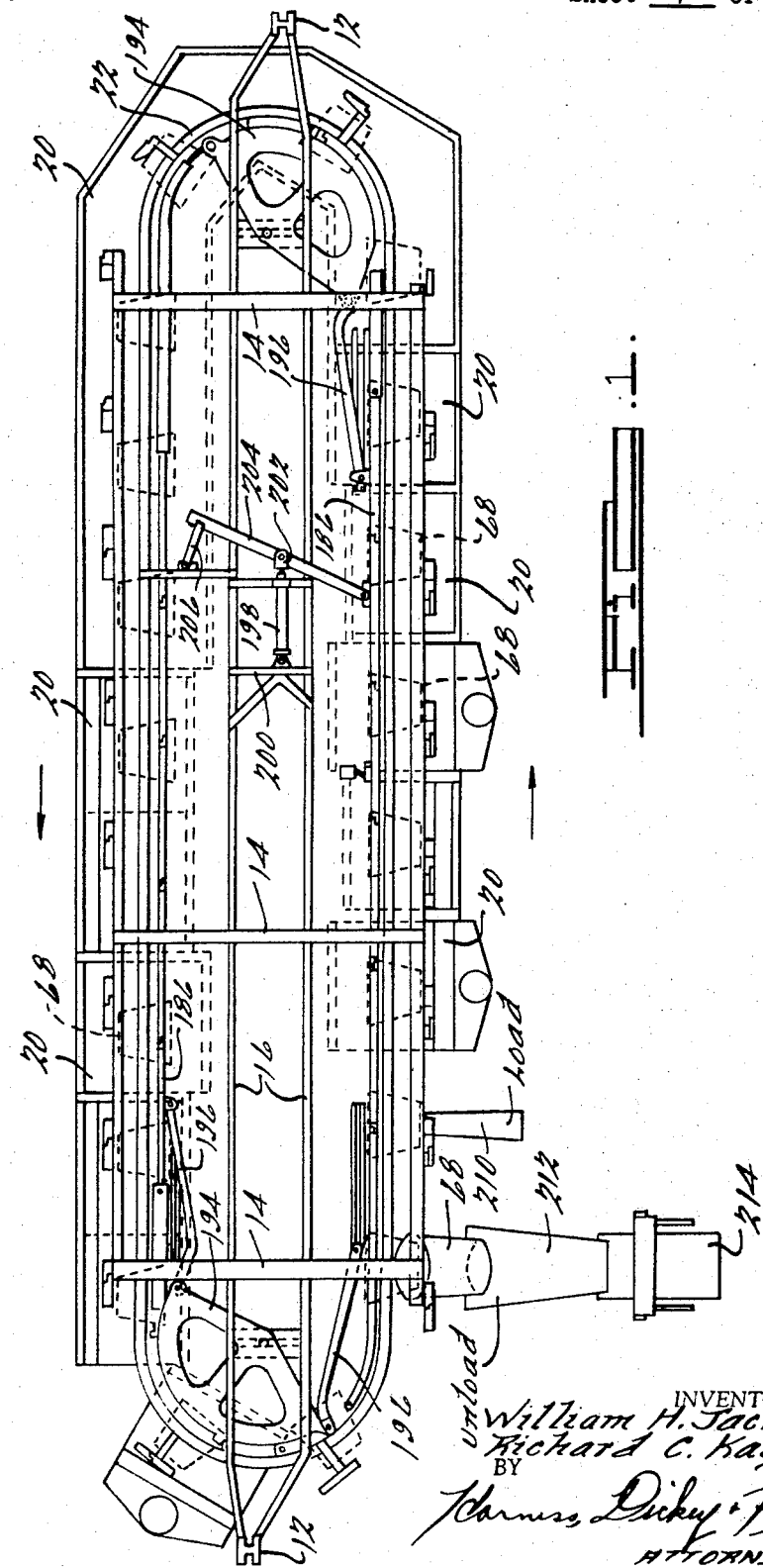

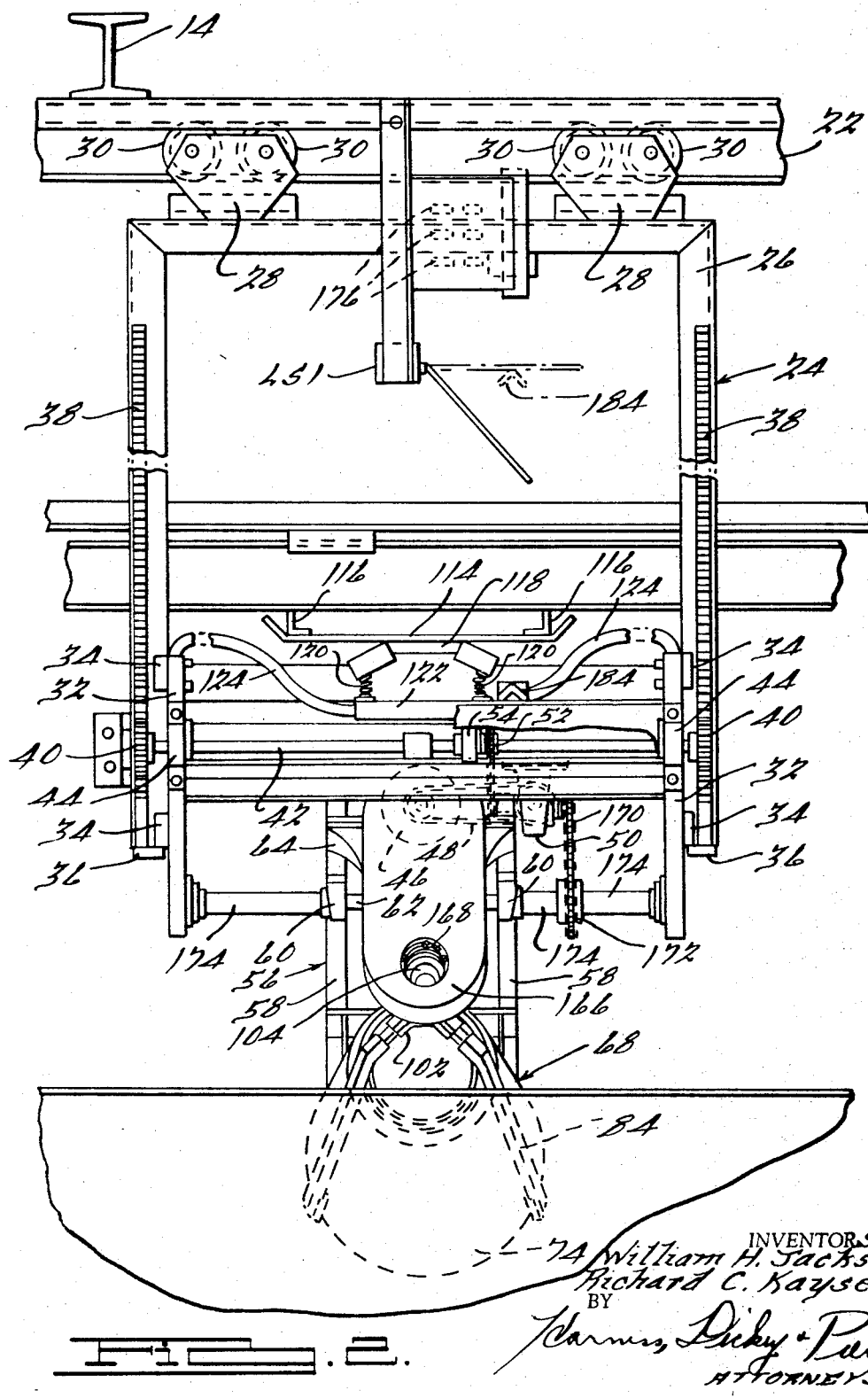

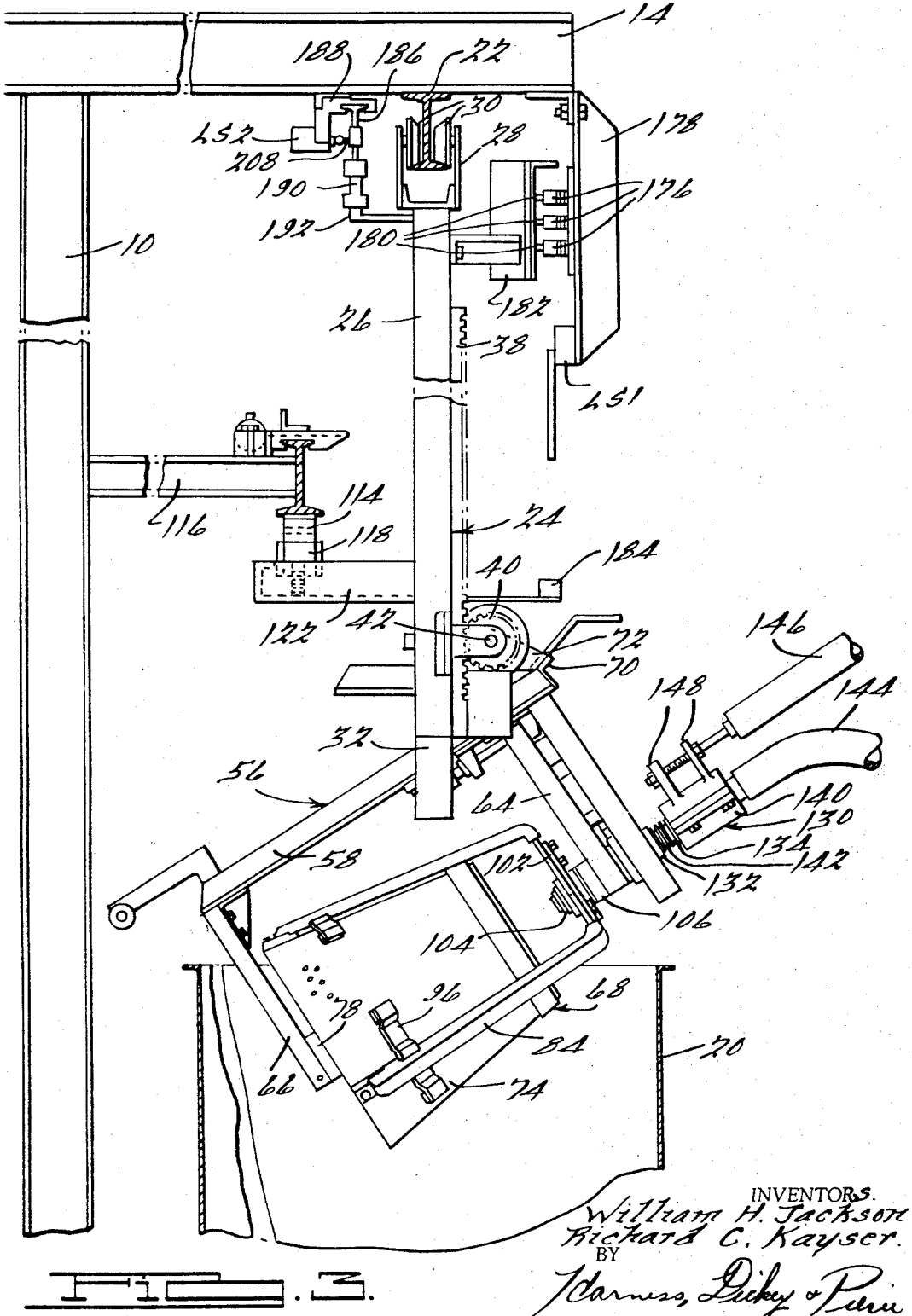

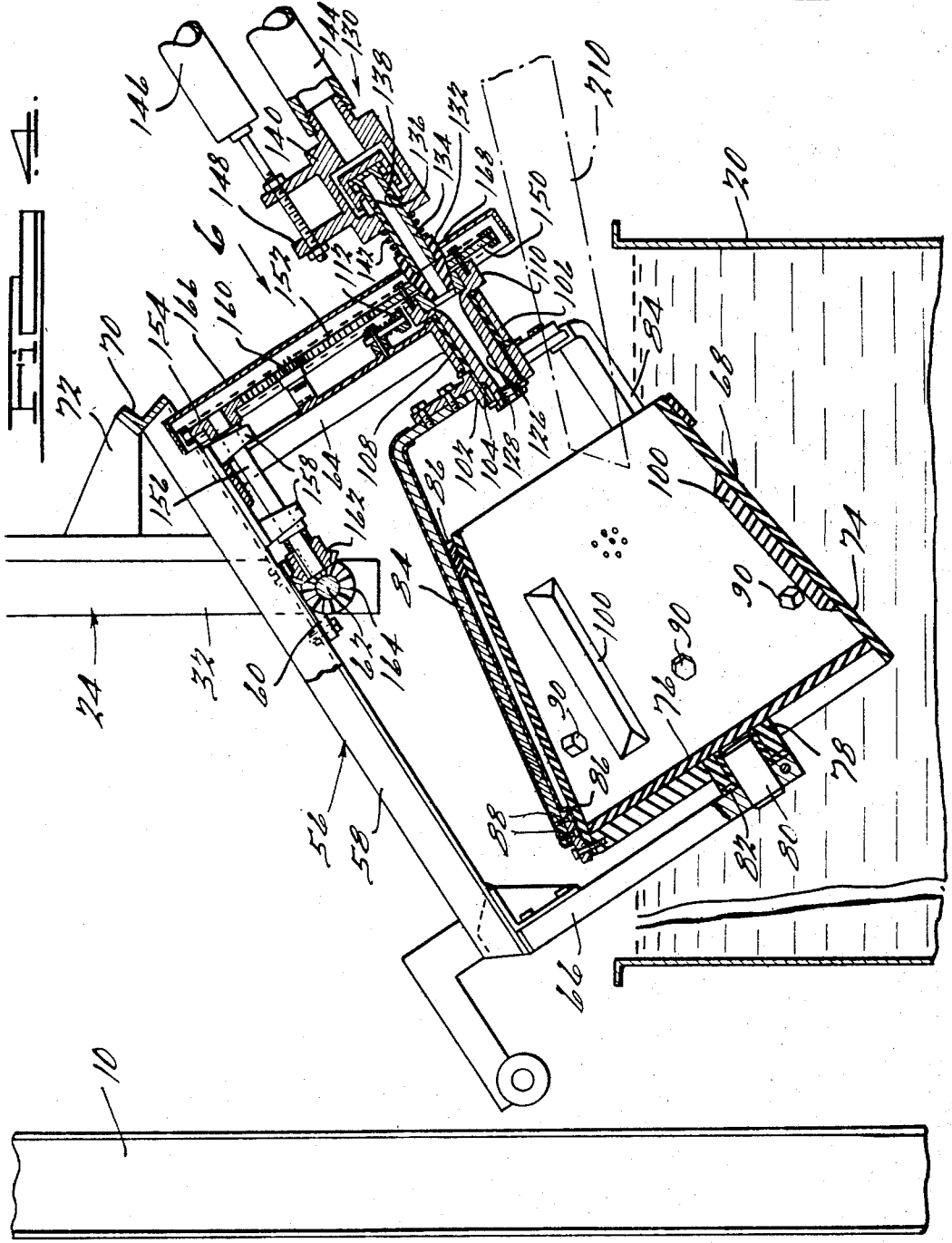

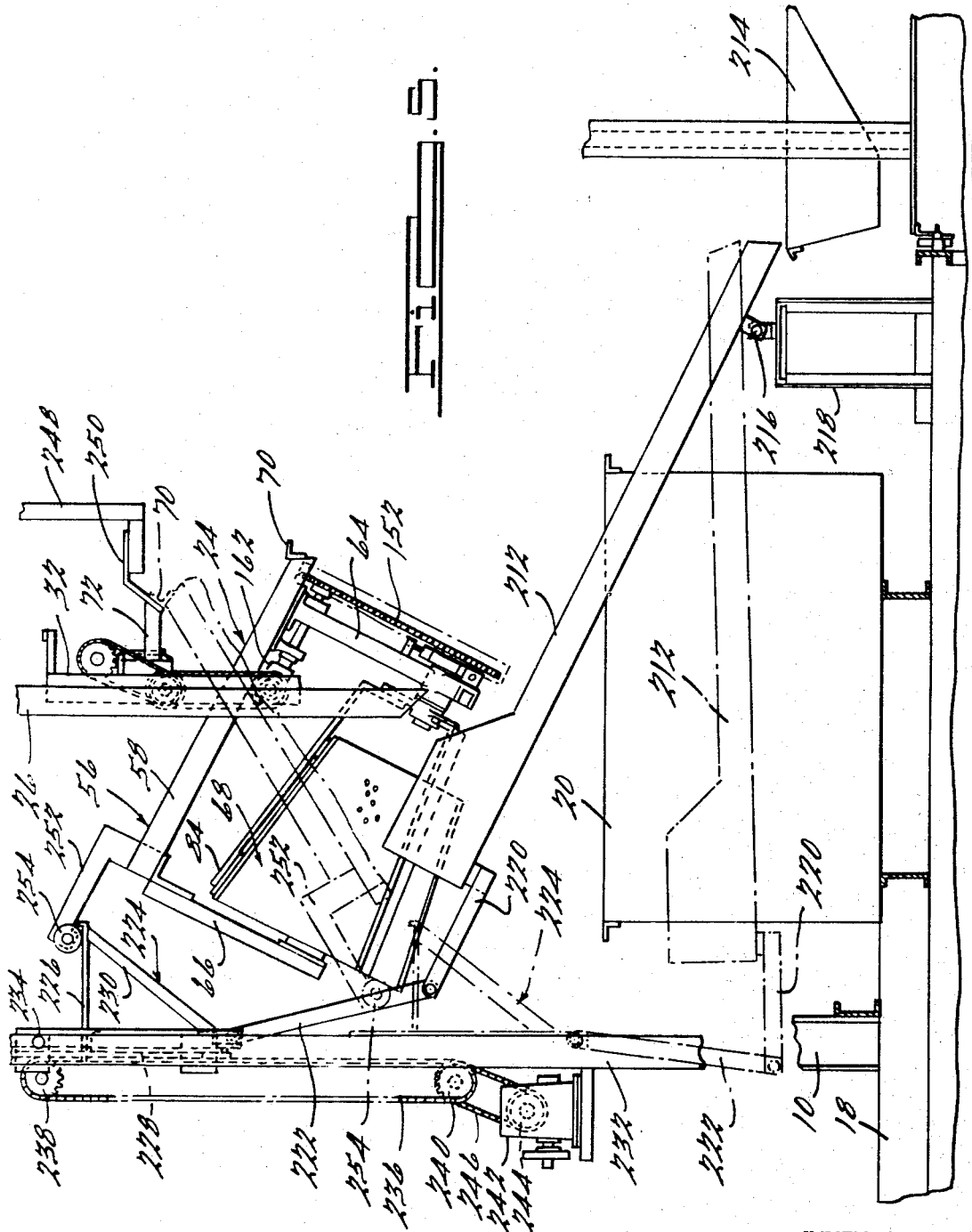

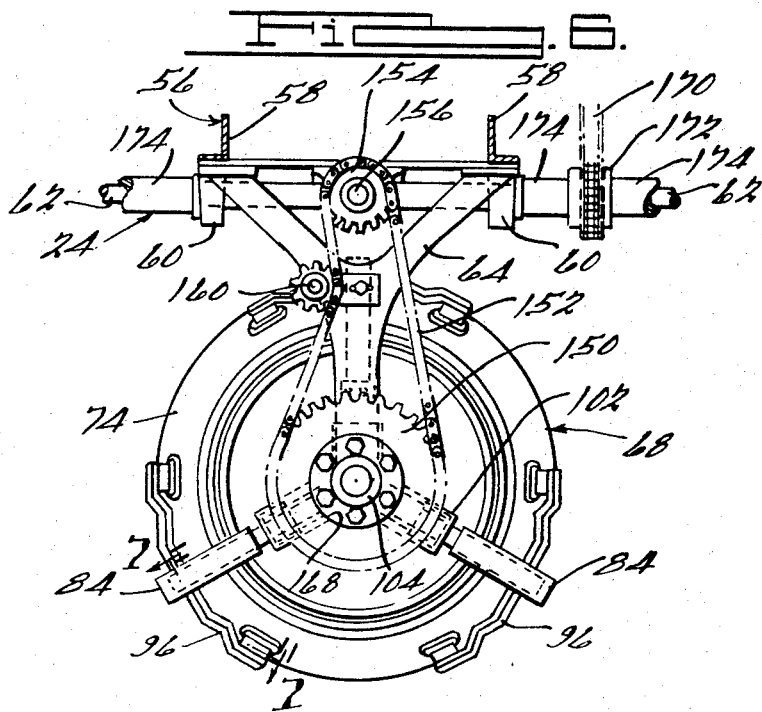

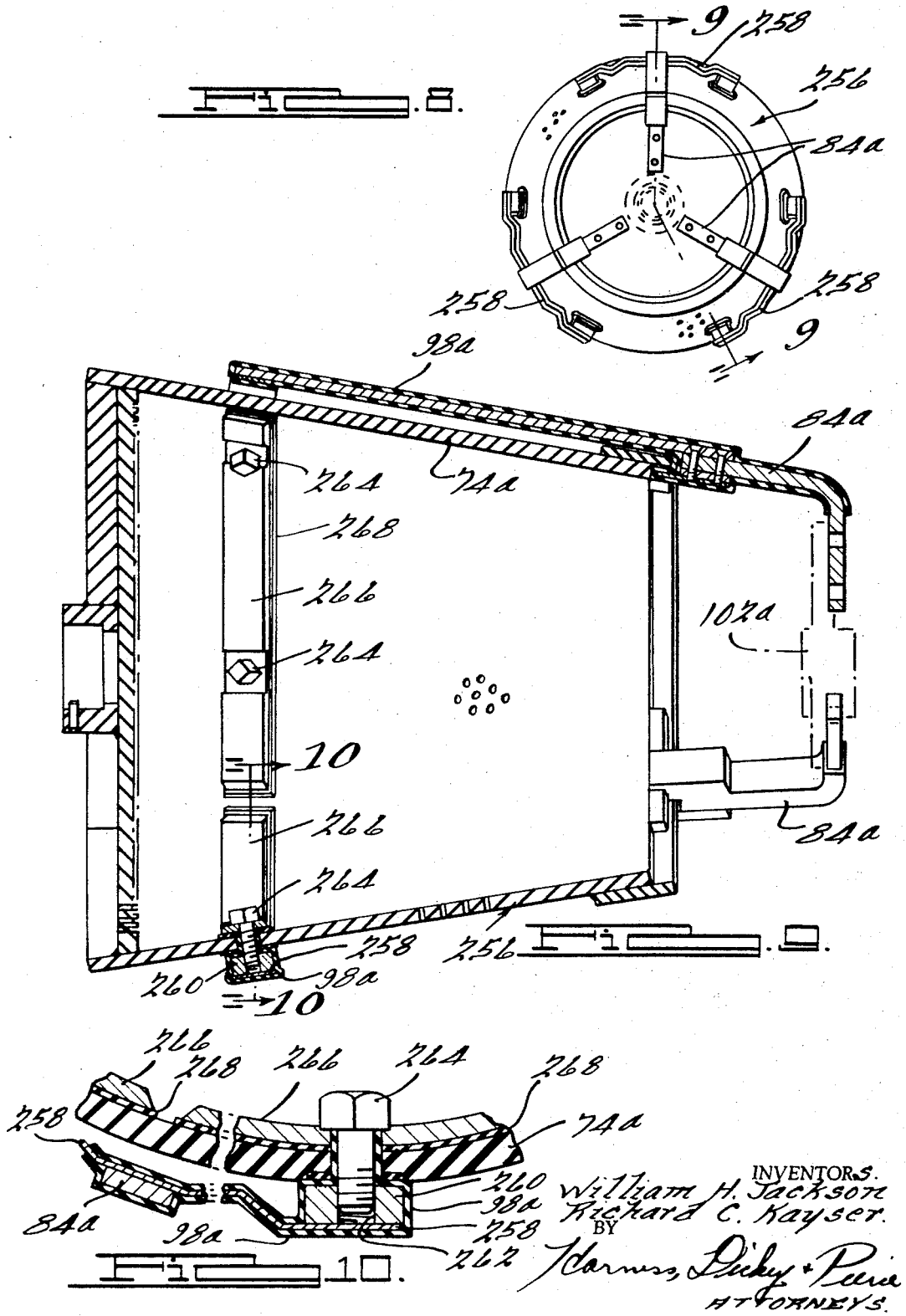

3,429,797
ELECTROPLATING APPARATUS
William H. Jackson, Birmingham, and Richard C. Kayser, Mount Clemens, Mich., assignors to The Udylite Corporation, a corporation of Delaware
Filed Aug. 25, 1965, Ser. No. 482,541
U.S. Cl. 204—202 17 Claims
Int. Cl. C23b 5/68

ABSTRACT OF THE DISCLOSURE

An endless conveyor system for a rotating and tiltable plating basket which includes a frame for the basket permitting the basket to be rotated or tilted and the frame plus basket to be moved horizontally or vertically.

---

The present invention broadly pertains to work handling apparatus and, more particularly, to an improved barrel-type conveying machine for conveying a plurality of workpieces through a series of liquid treating stations including one or more electroplating operations. More specifically, the present invention is directed to an improved conveying machine and an improved work carrier incorporated thereon which substantially facilitates the loading, treatment and unloading of bulk quantities of workpieces for processing through a preselected liquid treating sequence.

Conveying apparatuses of the general type to which the present invention is applicable are in widespread commercial use for handling relatively small workpieces in bulk quantities. Conventionally, conveying apparatuses of this general type employ barrel-like containers in which the workpieces are placed and are transported therein through the prescribed treating sequence. The barrel-like containers are conventionally of a porous or preforated construction to enable the treating solution to enter and contact the workpieces therein and to circulate through the containers during the rotation thereof while immersed in a treating solution.

Barrel-type conveying machines of the types heretofore known generally fall into two basic classes. The first class includes those machines employing a barrel of a polygonal cross section such as a hexagonal cross section which is supported at its end walls for rotation about a longitudinal axis and incorporates a removable panel through which the workpieces are loaded and removed from the interior thereof. The second class of barrel machines conventionally employs a perforated barrel which is of a conical configuration having an open upper portion and a framework from which the barrels are supported by an arm and which arm is intermittently raised and lowered in response to cams coacting with the arms for affecting an immersion or withdrawal of the barrel and workpieces contained therein relative to the treating solutions. In barrel-type plating apparatuses of either of the two general catagories as hereinbefore set forth, a continuing problem has been presented by the difficulty of gaining access to the workpieces contained in the container or in gaining access to the interior of the container for the purposes of loading or unloading the workpieces or in applying special treating solutions, such as rinse solutions thereto. It is also necessary in many instances to periodically inspect the workpieces during the course of their treatment and such inspections, due to the difficulty of gaining access to the workpieces, has heretofore constituted a difficult and time-consuming operation.

It is, accordingly, a principal object of the present invention to provide an improved conveying machine for transporting small workpieces in bulk quantities through a series of liquid treating stations which overcomes the problems and disadvantages associated with bulk processing apparatuses of the types heretofore known.

Another object of the present invention is to provide an improved conveying machine incorporating a plurality of work carriers thereon, each of which incorporates a barrel-like container for containing the workpieces and each of which carriers are independently operable for lifting and lowering the work containers into and out of the liquid treating solutions thereby substantially enhancing the processing flexibility and versatility of the machine.

A still further object of the present invention is to provide an improved conveying apparatus including a plurality of work carriers movably mounted thereon wherein each of said work carriers incorporates a barrel-like container which is mounted for tilting movement to and from an operating position and a dumping position, substantially simplifying the unloading of the bulk quantity of small workpieces contained therein.

Still another object of the present invention is to provide an improved work carrier for bulk processing equipment incorporating a rotatably mounted tiltable barrel-like container which, when in the operative position, is angularly disposed with its upper end positioned outwardly of the machine thereby substantially facilitating access to the interior of the container for inspection of the parts contained therein as well as for facilitating a loading of workpieces into the container.

A further object of the present invention is to provide an improved conveying apparatus incorporating a plurality of work carriers, each including a rotatable workpiece container tiltably mounted on an independently elevatable frame and an unloading chute on the conveying apparatus proper which, during a tilting of the container to a dump position, is automatically lifted to receive the parts unloaded therefrom.

Yet still another object of the present invention is to provide an improved work carrier for a bulk processing machine incorporating a rotatably mounted tiltable barrel-like container rotatably supported on a hub which incorporates a nozzle therethrough facilitating the discharge of selected treating solutions into the interior of the barrel and against the surfaces of the workpieces contained therein.

Yet still a further object of the present invention is to provide an improved conveying apparatus incorporating a plurality of work carriers thereon each provided with rotatable and tiltable barrel-like containers and which apparatus is of simple design, of durable and extremely versatile operation, and of economical manufacture and use.

The foregoing and other objects and advantages of the present invention are achieved by a conveying machine including a rail on which a plurality of work carriers are movably mounted and are advanced therealong and wherein each of the work carriers comprises a supporting frame on which a movable frame is mounted for movement to and from a raised position and a lowered position. The movable frame of each work carrier is provided with a tiltable frame on which a barrel container is rotatably mounted and is tiltable to and from a normal operating position in which the open end of the barrel is directed angularly upwardly and is readily accessible to personnel and loading equipment and to an inoperative or unloading position in which the workpieces can readily be dumped into a chute which, in accordance with the preferred construction of the present invention, is integrally incorporated and operable by the barrel tilting mechanism. Unitary reversible power means is carried on each work carrier for effecting up and down movement of the movable frame and container thereon as well as for effecting rotation of the container while it is immersed in a treating solution. It is further contemplated within the scope of the present invention that the framework employed for rotatably supporting the barrel on the tiltable frame is electrified which, in turn, is connected to suitable contactors disposed within the interior of the container effecting a corresponding electrification of the workpieces contained therein. In accordance with another embodiment of the present invention, the mounting mechanism for rotatably supporting the barrel is formed with a nozzle passage extending axially in alignment with the open end of the barrel, thereby facilitating the discharge of supplemental treating solutions into the interior of the barrel and on the surfaces of the workpieces contained therein.

Other objects and advantages of the present invention will become apparent from the following detailed description taken in conjunction with the accompanying drawings, wherein:

FIGURE 1 is a plan view of a conveying apparatus constructed in accordance with the preferred embodiments of the present invention;

FIG. 2 is an enlarged fragmentary front elevational view of a work carrier movably supported on a rail of the machine as shown in FIGURE 1;

FIG. 3 is a fragmentary side elevational view of the work carrier and machine as shown in FIGURE 2;

FIG. 4 is a fragmentary enlarged side elevational view, partly in section, of the barrel container and further illustrating a liquid supply nozzle disposed in discharging relationship in the nozzle formed on the barrel mounting mechanism;

FIG. 5 is a fragmentary side elevational view illustrating the unloading chute and barrel tilt mechanism with the barrel container disposed in a dump position for discharging the bulk quantities of small workpieces therein into the unloading chute;

FIG. 6 is a plan view of the barrel container rotating drive mechanism as shown in the work carrier of FIGURE 4 and as viewed along the arrow indicated at 6 thereon;

FIG. 7 is a fragmentary magnified sectional view of an electrical contact button incorporated in the barrel container shown in FIGURE 6 and taken along the line 7—7 thereof;

FIG. 8 is a plan view of a barrel container incorporating contact means in accordance with an alternative embodiment of the present invention;

FIG. 9 is a magnified longitudinal sectional view of the barrel container shown in FIGURE 8 and taken along the line 9—9 thereof; and FIG. 10 is a fragmentary magnified sectional view of the electrical contactor incorporated in the barrel shown in FIGURE 9 and taken along the line 10—10 thereof.

Referring now in detail to the drawings, and as may be best seen in FIGURES 1–3, a conveying machine of the so-called return type is illustrated on which the improved work carriers comprising the present invention are movably mounted. The conveying machine comprises a framework including a series of central columns 10 and a pair of end columns 12 to the upper ends of which transverse beams 14 are securely fastened and to the underside of which longitudinal beams 16 are secured and extend for substantially the entire length of the machine. The central columns 10 are rigidly affixed at their lower ends, as shown in FIGURE 5, to base beams 18 which form a platform on which a plurality of treating receptacles 20 are disposed in aligned relationship. A monorail 22 of an I-shaped cross section is rigidly secured to the lower surfaces of the outer end portions of the transverse beams 14 on which a plurality of work carriers 24 are movably mounted. The rail 22 is of a continuous loop-shaped configuration and is disposed above the treating receptacles 20 whereby the work carriers are transferred in a counterclockwise direction in accordance with the direction of the arrows indicated in FIGURE 1, from a load station through the several treating receptacles to an unload station disposed adjacent thereto.

A conveying machine of the general type shown in FIGURE 1 is fully disclosed in United States Patent No. 3,009,467, granted on Nov. 21, 1961, entitled "Conveyor Apparatus," and which patent is assigned to the same assignee as the present invention. Reference is made to the aforementioned United States patent for additional specific details of the construction and operation of the machine on which the improved work carriers comprising the present invention, as subsequently described, are movably mounted.

Each of the work carriers 24, as best seen in FIGURES 2 and 3, comprises a supporting frame 26 of an inverted U-shaped configuration which is movably mounted on the monorail 22 by means of a pair of trolleys 28 pivotally mounted to the upper horizontal member thereof and including a series of flanged rollers 30 which are disposed in rolling bearing contact against the upper surface of the lower flange of the monorail. A second or movable frame 32 is guidably mounted on the depending legs of the supporting frame 26 by means of guide shoes 34 disposed in sliding bearing contact against the inner edges of the supporting frame, as best seen in FIGURE 2. A stop 36 is provided at the lower end of each of the legs of the supporting frame 26, which is adapted to engage the lower guide shoes 34 on the movable frame, preventing relative downward movement therebetween beyond a preselected point. The movable frame 32 is shown in FIGURE 2 in the fully lowered position in which the lower guide shoes 34 are disposed in bearing supporting contact against the stops 36 on the supporting frame. Suitable means is provided for moving the movable frame 32 up and down on the supporting frame 26. In the exemplary embodiment illustrated in the drawings, and as may be best seen in FIGURES 2 and 3, the elevating means comprises racks 38 affixed to the face surfaces of the legs of the supporting frame 26 and a pair of pinions 40 which are affixed to the ends of a cross shaft 42 and are disposed in constant meshing relationship with the racks 38. The cross shaft 42, as best seen in FIGURE 2, is rotatably supported at its end portions by means of bearing blocks 44 affixed to the movable frame.

Rotation of the cross shaft 42 and the pinions 40 thereon, to achieve a lifting and lowering movement of the movable frame, is achieved by means of a reversible electric motor 46 which is mounted on the movable frame and is drivingly coupled by means of a belt 48 to the input shaft of a gear reducer 50 which is of a self-locking worm wheel type which is also mounted on and movable with the movable frame 32. One of the output shafts of the gear reducer 50 is drivingly coupled by means of a sprocket chain 52, which is trained around and drives an overrunning clutch assembly 54 mounted on the cross shaft 42.

The movable frame 32 also supports a tiltable frame 56 including a pair of spaced side members 58 which are pivotally connected by means of a pair of bearing blocks 60 to a shaft 62 rotatably supported between the lower ends of the vertical members comprising the movable frame 32, as best seen in FIGURE 2. A general Y-shaped yoke member 64 is affixed to the upper end portions of the side members 58 and a base member 66 is affixed to the lower ends of the side members 58 forming a generally U-shaped frame, as best seen in FIGURE 3. A treating container or barrel 68 is rotatably supported between the yoke 64 and base member 66 for normal rotation about an axis disposed in a plane angularly intersecting the axis of tilting movement of the tiltable frame. The tiltable frame 56 is mounted on the shaft 62 at a location such that its center of gravity is disposed inwardly or to the left, as viewed in FIGURE 3, such that the barrel normally, through the action of gravity, is retained in the position as shown in solid lines in FIGURE 3. This position corresponds to the normal operating position during the transfer of the barrel and the workpieces contained therein through the several treating stations.

Pivoting movement of the tiltable frame and the barrel 68 thereon beyond the position shown in FIGURE 3, is prevented by means of a stop member 70 affixed to the upper ends of the side members 58 which is engageable with a stop member 72 affixed to the movable frame. In accordance with this arrangement, the barrel 68 rotates in an angularly inclined position as shown in FIGURE 3 about an axis which, in the specific arrangement illustrated, lies in a plane perpendicular to the axis of tilting movement of the tiltable frame.

The barrel assembly 68, as best seen in FIGURE 4, comprises a container 74 of a right truncated conical configuration which is closed at its lower end and is open at its upper end and is formed of a suitable nonconductive material, such as polyethylene, polypropylene, phenolic or other suitable plastics which are of adequate strength and are chemically resistant to the alkaline and acidic solutions in which the containers are immersed. The walls of the container 74 are suitably perforated to permit the circulation of the treating solution into and out of the interior of the barrel in order to contact the workpieces contained therein. A perforated bottom panel 76 is provided in the container 74, to the center of which a cylindrical sleeve 78 is securely fastened and which is disposed in bearing contact around a stub shaft 80 affixed to and projecting from the base member 66. A suitable bearing material 82 is disposed between the mating surfaces of the cylindrical sleeve 78 and stub shaft 82 to reduce the friction of rotation.

The periphery of the container 74 is supported by means of three bails 84 which are disposed in substantially equal circumferentially spaced relationship and are affixed to suitable blocks or circular ribs 86, as best seen in FIGURE 4, by means such as screws 88. The bails 84 are of an electrically conductive metal such as copper, brass, or the like, and are operative to supply electrical current to contactors such as button contacts 90 disposed in electrical contact therewith and projecting inwardly of the interior of the container. The button contacts 90 are disposed at substantially 60° increments and, as best seen in FIGURE 7, comprise a conductive bolt 92 having its threaded shank portion disposed in electrical contact with a block 94 affixed to the end of a strap 96 secured in electrical contact to the bails 84. The surfaces of the bails 84, block 94 and strap 96 are provided with a suitable nonconductive chemically resistant coating 98 to prevent chemical attack thereof when immersed in the alkaline and acidic treating solutions. The protective coating 98 may be of any suitable chemically resistant material such as vinyl plastisols, for example. In accordance with the arrangement of the button contacts, as shown in FIGURES 4 and 7, continuous electrification of the workpieces contained within the interior of the barrel is assured at those stations at which an electroplating operation, for example, is to be performed. The interior of the barrel may also be provided, as shown in FIGURE 4, with a series of tumbling ribs 100 to impart a tumbling action to the workpieces contained within the container during the rotation thereof.

The upper ends of the bails 84, as shown in FIGURES 4 and 6, are bent radially inwardly and are securely affixed in electrical contact with the arms of a spider 102 which is keyed or otherwise affixed to the periphery of a hollow stepped shaft 104 rotatably mounted within a bearing sleeve 106 formed at the end of the yoke 64. The shaft 104 is electrically insulated from the bearing sleeve 106 by a suitable nonconductive bearing material 108. The peripheral surface indicated at 110 of the stepped shaft 104 serves as a commutator, against which a brush contact 112 is disposed in resilient sliding relationship and to which electrical current is supplied by means of an electrical conductor connected thereto. In accordance with this arrangement, electrical current can be supplied to the workpieces contained within the barrel through the brush contact 112, the stepped shaft 104, the spider 102 mounted on the stepped shaft, the bails 84 connected to the spider and in turn the button contacts 90 connected to the bails. The foregoing arrangement substantially simplifies the electrification of workpieces in barrel-like containers in comparison to the various cumbersome techniques heretofore employed.

Electrical current supplied to the brush contact 112 can be readily supplied from a bus bar 114, as shown in FIGURES 2 and 3, mounted inwardly of the work carrier 24 on suitable outriggers 116 affixed to the central frame of the machine. A resiliently biased contact brush 118 supported on springs 120 is mounted on a rearwardly extending member 122 affixed to the supporting frame 26, as best seen in FIGURE 3. Accordingly, as a work carrier is advanced into position at a treating station at which an electroplating operation is to be performed, the contact brush 118 slides beneath and maintains intimate electrical contact with a bus bar 114 provided at that station. The electrical current received by the contact brush 118 is transmitted such as by means of cables 124, as shown in FIGURE 2, which are flexibly supported on the movable frame 42 and terminate in electrical contact with the brush contact 112, as shown in FIGURE 4. The provision of the insulated bearing material 108 and the insulated mounting of the brush contact 112 prevents electrification of the machine components other than the stepped shaft, spider and bails supporting the barrel container.

In addition to a substantial simplification in providing electrical current to the workpieces, the improved work carrier comprising the present invention also substantially facilitates the application of fluids, including liquids and gases, directly to the workpieces while in the treating barrel. As shown in FIGURES 3 and 4, the stepped shaft 104 is formed with an axially extending tapered port or nozzle 126 which is exposed and accessible from a position outwardly of the treating receptacles 20. The inner end of the port 126 is formed with a threaded portion indicated at 128 in FIGURE 4, into which various adapter nozzles can be removably secured to provide a desired spray pattern into the interior of the container 74.

The supply of a suitable treating solution or a deionized water rinse, for example, to the workpieces can be achieved by a suitable liquid supply assembly indicated at 130 which can be manually or remotely actuable. The liquid supply assembly 130 includes a tapered insulated nozzle 132 which is adapted to be sealingly disposed in the outer end of the port 126 formed through the stepped shaft 104. The nozzle 132 is mounted at the end of a resiliently biased tube 134 and is formed with ports 136 adapted to be disposed in communication with an annular supply chamber 138 formed in the head 140 of the liquid supply assembly. A coil spring 142 normally biases the tube 134 and the nozzle 132 thereon to a projected position in which the ports 136 are disposed out of communication with the annular chamber 138, in which event no liquid is ejected therefrom. When, however, the nozzle 132 is inserted into the port 126 through the stepped shaft, effecting a retraction of the tube 134 to the position as shown in FIGURE 4, alignment of the ports with the annular chamber 138 occurs whereupon liquid supplied from a flexible conduit 144 is discharged through the port 126 into the interior of the treating barrel.

Movement of the liquid supply assembly to and from a dispensing position and a nondispensing position, can be achieved manually or automatically in accordance with the arrangement as exemplarily illustrated in FIGURES 3 and 4. As shown, a suitable double-acting fluid-actuated cylinder 146 is provided, the piston rod of which is connected to flanges 148 on the head 140 and is operative to move the head to and from a dispensing position and a nondispensing position. The liquid supply assembly 130 can be mounted in appropriate relationship such that the insulated nozzle 132 thereof is adapted to be disposed in axial alignment with the port 126 extending through the stepped shaft of each carriage as the carriages are sequentially moved into position at that station. The liquid supply assembly can also be advantageously employed for discharging comparatively low pressure compressed air into the interior of the treating barrel through the port 126 to dislodge or blow out any liquid or treating solution which may be entrapped in the perforations through the walls thereof thereby substantially reducing solution drag-out.

Rotation of the barrel 68 about an axis disposed in a plane angularly intersecting the axis of tilting movement of the tiltable frame 56 is achieved by the same reversible electric motor 46 employed for lifting and lowering the movable frame through a drive mechanism, as hereinafter described. As may be best seen in FIGURES 4 and 6, a driven sprocket 150 is securely affixed such as by bolts, for example, and in insulated relationship on the stepped shaft 104. The driven sprocket 150 is formed with a concentric aperture through the center thereof for providing access of the nozzle of the liquid supply assembly to the port 126. A drive chain 152 is trained around the driven sprocket 150 and around a drive sprocket 154 affixed to the end of a shaft 156 rotatably supported in bearing blocks 158 mounted between the side members 58 of the tiltable frame 56. A suitable idler sprocket 160 is adjustably mounted on the yoke 68 and is positionable so as to provide the requisite tension of the drive chain 152.

The lower end of the shaft 156 is provided with a driven bevel gear 162 affixed thereto which is disposed in constant meshing relationship with a drive bevel gear 164 affixed to the shaft 62. Accordingly, rotation of the shaft 62 and the drive bevel gear 164 thereon effects a corresponding rotation of the shaft 156 by virtue of the meshing relationship of the driven gear 162 with a corresponding movement of the drive chain 152 and a corresponding rotation of the barrel 68. In order to prevent extraneous matter from coming in contact with the drive chain and the several chain sprockets, a chain cover 166 is preferably mounted in surrounding relationship around the drive chain. As will be noted in FIGURES 2, 4 and 6, the chain cover 166 is formed with a port 168 in alignment with the port through the stepped shaft 104 to provide access for the liquid supply assembly 130.

The rotation of the shaft 62 is achieved by means of a drive chain 170, as shown in FIGURE 2, which is drivingly coupled to the other output shaft of the gear reducer 50 and is trained around a driven sprocket 172 affixed to the shaft 62. Appropriate longitudinal alignment of the tiltable frame 56 and the driven sprocket 172 on the shaft 62 is achieved by a series of tubular spacer members 174. It will be noted that the driven bevel gear 162 remains in constant meshing relationship with the drive bevel gear 164 in all tilted positions of the tiltable frame 56 as well as in the normal operating position as shown in FIGURE 4.

The operation of the work carriage lift and barrel rotation mechanism will now be described with particular reference to FIGURES 2-4 inclusive. Electrical energy is supplied to the reversible electric motor 46 on each carriage either by a continuous electrical feed rail disposed in aligned relationship along the treating receptacles or, alternatively, by means of three contacts 176 supported on a frame 178 affixed to the outer end of the transverse member 14, as best seen in FIGURE 3. Each work carrier in turn incorporates three contact brushes 180 mounted in a box 182 supported on the upper portion of the supporting frame 26 which are adapted to be disposed in electrical contact with the contacts 176 when the work carrier is appropriately positioned at a treating station. After all of the work carriers on the machine have been advanced to the next station as signaled by the central control circuit, electrical energy is supplied through the contacts 176 and contact brushes 180 to the reversible electrical motor 46 which commences to rotate in one direction and in which direction the overrunning clutch is rotated in an overrunning condition such that by virtue of the weight of the movable frame and the barrel assembly supported thereon a descending movement of the movable frame and barrel occurs from a raised position to a fully lowered position. The speed of descending movement of the movable frame and barrel thereon, is controlled by the speed of rotation of the overrunning clutch as given through the gear reducer 50. Accordingly, the movable frame descends at a speed restricted by the overrunning characteristics of the clutch. When the movable frame attains the fully lowered position, it is retained in that position by means of the coaction between the lower guide shoes 34 and the stops 36 affixed to the lower ends of the supporting frame 26. The electric motor 46 remains energized and the barrel 68 continues to rotate in the same direction while it is immersed in the treating solution contained in the treating receptacle therebelow. The continuous driving of the overrunning clutch 54 has no effect on the cross shaft 42 due to the overrunning characteristic thereof.

At the completion of a preselected down dwell period, as established by a suitable timer in the central control circuit, a reversing electrical current is supplied to the contacts 176 and contact brushes 180 whereupon the electrical motor 46 commences to rotate in the opposite direction. Accordingly, the barrel 68 rotates in an opposite direction and an engagement of the overrunning clutch 54 occurs whereupon the cross shaft 42 and pinions 40 at the ends thereof effect an upward movement of the movable frame along the racks 38. The ascending movement of the movable frame continues until an actuator 184 on the movable frame contacts and trips up position limit switch LS1 effecting a deenergization of the contacts 176 and a corresponding deenergization of the reversible drive motor 46. The movable frame and barrel are accordingly retained in the elevated position by means of the locking worm wheel gear reducer 50. When all of the carriages which are to be elevated have attained the fully raised position, as signaled by the tripping of each of the up position limit switches LS1, by the respective actuator 184, as shown in phantom in FIGURE 2, the central control circuit effects energization of the transfer mechanism and movement of each of the work carriages to the next succeeding treating station.

The transfer of the work carriages 24 from one station to the next adjacent station in accordance with the exemplary conveying machine shown in the drawings, is achieved by means of a reciprocable pusher mechanism including a pusher bar 186 of a T-shaped cross section, as best seen in FIGURE 3, which is slidably disposed in guide shoes 188 and extends longitudinally along and inwardly of the rail 22. A series of pushers 190 are pivotally mounted at longitudinally spaced intervals to the pusher bar 186 and are operative to engage a pusher member 192 affixed to and projecting rearwardly of the supporting frame 26 of each carrier. The pusher bars 186 extend longitudinally along each of the straight side sections of the machine effecting advancement of the work carriers in increments along those sections. Along the arcuate turnaround end portions of the machine, a sector place 194 is rotatably mounted at substantially the center of arcuate curvature thereof and is connected by means of links 196 to the pusher bar. A series of pushers are pivotally mounted along the peripheral edge of the sector plates 194 and are operative to engage the pusher members 192 on the work carrier effecting advancement thereof along the arcuate rail sections. In accordance with the arrangement as best seen in FIGURE 1, longitudinal reciprocation of the pusher bars 186 effects a corresponding oscillating movement of each of the sector plates 194 to and from a retracted position and a projected position. The longitudinal reciprocating movement of the pusher bars and oscillating movement of the sector plates is achieved by means of a transfer cylinder 198 as shown in FIGURE 1, having its blank end pivotally secured to a cross member 200 on the frame. The piston rod of the transfer cylinder 198 is formed with a clevis-type fitting 202 which is connected to a link 204 having one end thereof secured to a pusher bar on one side of the machine and the other end thereof connected to a second link 206 pivotally secured to the machine frame. The combination of the links 204 and 206 provide for a multiplication in the projecting travel of the piston rod of the transfer cylinder.

The length of projecting and retracting travel of the reciprocable pusher mechanism, can be controlled by the bottoming of the piston in the transfer cylinder or, alternatively, by incorporating a transfer limit switch LS2 as shown in FIGURE 3, which is adapted to be tripped by actuators 208 on the pusher bar when the fully projected and fully retracted positions are attained, respectively. The transfer limit switch LS2, accordingly, signals the central control circuit achieving thereby a coordinated transfer of the work carriers and the actuation of the carriage lift motors to achieve a prescribed treating sequence.

It will be apparent from the structure and the operation of the conveying machine and the improved work carriers thereon that the barrels containing the bulk quantities of workpieces can be readily transferred from the load station through the successive treating stations during which time the workpieces are always readily accessible for inspection through the open top of the barrel facing outwardly and within convenient reach of the machine operators. At single station treating receptacles, the barrel is lowered from a raised position and retained in the lowered position for a preselected treatment time after which it is again elevated in order to permit a transfer of the barrel above the tank partition separating adjoining treating receptacles. At multiple station treating receptacles, such as the multiple station tank 20 at the right end of the machine as viewed in FIGURE 1, the barrel is lowered at the first station and retained in the lowered position during the transfer thereof from one station to the next station until the last station of the multiple treating receptacle is attained at which point it is raised.

The extreme accessibility of the interior of the plating barrel substantially facilitates a loading of measured quantites of small workpieces therein such as by means of a loading chute 210 illustrated in phantom in FIGURE 4. As shown, the loading chute 210 can be readily projected into the open end of the barrel while either in a raised or in a lowered position, depositing therein a pre-weighed quantity of workpieces. The ability to load the barrels while in a raised position provides for a substantial time saving in that the work carrier can be readily transferred with a barrel in the raised position to the next adjoining treating receptacle without having to first lift the barrel from the lowered position. In addition to a substantial simplification in the loading of the barrels, the improved structure of the work carrier also provides for a substantial simplification in the unloading thereof in connection with which reference is made to FIGURES 1 and 5. As will be noted in FIGURE 1, the unload station is provided with an unloading chute 212 which extends outwardly of the machine and is adapted to be disposed with its discharge end in communication with a suitable receiver such as the receiver indicated at 214. In accordance with a preferred embodiment of the present invention, the unloading chute is automatically controlled to effect a concurrent tilting of the tiltable frame and the barrel thereon to a dump position and wherein the unloading chute is elevated so as to receive the bulk quantity of workpieces discharged therefrom. This arrangement is best seen in FIGURE 5.

As shown in FIGURE 5, the unloading chute 212 is pivotally mounted at its outward end on a pivot pin 216 secured to an upstanding frame 218 mounted outwardly of the aligned series of treating receptacles 20. The inward end of the unloading chute 112 is supported by means of an arm 220 which is pivotally secured at its inward end to a link 222, the upper end of which is pivotally connected to an elevator assembly 224. The elevator assembly 224 comprises a platform 226 affixed to a frame 228 and which is braced at its outer end by a diagonal brace 230. The elevator assembly 224 is disposed between a pair of upright guide members 232 and incorporates guide rollers 234 thereon for movement of the elevator assembly to and from a lowered position, as shown in phantom in FIGURE 5, to a raised position as shown in solid lines. Movement of the elevator assembly to and from the lowered and raised position is achieved by suitable lift means such as, for example, an elevator chain 236 trained about an upper sprocket 238 and a lower sprocket 240 having its outward flight connected to the frame of the elevator assembly. Movement of the chain to and from a raised and lowered position is achieved by a drive motor connected to a gear reducer 242 having a driving sprocket 244 around which a drive chain 246 is trained and disposed in driving relationship with respect to the lower sprocket 240.

A work carrier having completed its treating sequence is advanced to the unload station with the movable frame and the barrel thereon in the fully raised position. When all carriers have attained the appropriate station, the reversible drive motor is energized effecting a lowering of the movable frames of those work carriers which are to be lowered and the work carrier as shown in FIGURE 5 position at the unload station is engaged by means of an L-shaped support 248 affixed to the frame by means of the coaction with an engaging member 250 affixed to and projecting outwardly of the stop member 72 affixed to the movable frame and the barrel thereon is retained at a position spaced upwardly of the fully lowered position. The reversible drive motor remains energized whereupon the barrel 68 continues to rotate, effecting a tumbling of the workpieces contained therein.

The tiltable frame 56 is formed with a rearwardly projecting arm 252 having a roller 254 rotatably mounted on the end portion thereof which is adapted to be engaged by the platform 226 of the elevator assembly 224. At a preselected time interval, the drive motor 242 of the lift assembly is energized effecting movement of the elevator assembly 224 from the lowered position, as shown in phantom, to the raised position as shown in solid lines in FIGURE 5, whereupon the arm 252 of the tiltable frame and the barrel thereon is tilted from the position as shown in phantom in FIGURE 5, to the position as shown in solid lines. In the raised position of the tiltable frame, the barrel 68 is disposed in a dumping position and continual rotation thereof effects a substantially complete discharge of the workpieces therefrom into a loading chute 212 which concurrently is elevated to a position beneath the tilted barrels to receive the workpieces discharged therefrom. The workpieces readily pass, by gravity, down the unloading chute 212, into the receiver 214 disposed outwardly of the machine frame.

At the completion of a preselected unload period, the drive motor 242 is again energized in a reverse direction whereupon the elevator assembly 224 is moved from the raised position as shown in FIGURE 5, to the lowered position shown in phantom, accompanied by a corresponding upward tilting of the barrel 68 and a lowering of the unload chute 212 to the poistion as shown in phantom. After a preselected dwell period as dictated by the central control circuit, the reversible motor on the carrier is reversed effecting elevation of the movable frame and barrel to the fully elevated position prior to transfer to the next adjacent load station.

It will be appreciated by those skilled in the art that the automatic loading and unloading of the barrels can readily be coordinated with the operating sequence of the machine providing therewith a substantial simplification in the loading and unloading techniques heretofore employed in bulk treating apparatus incorporating barrel-like work containers.

In accordance with an alternative embodiment of the present invention, still further improvements are provided in the electrification of the workpieces contained in the barrel. The construction of a plating barrel 256, as best seen in FIGURES 8–10, inclusive, is similar to that hereinbefore described in connection with the barrel 68 incorporating the contact buttons 90, and like components thereof, have been designated with the same numeral previously employed with the suffix letter "a" affixed thereto. As shown in FIGURES 8–10, the barrel 256 includes the electrically conductive bails 84a affixed to a spider 102a at one end thereof and to the periphery of the container 74a in the manner previously described. The lower ends of each bail 84a is secured in electrical contact with a strap 258 formed with a metallic block 260 at the ends thereof which are formed with a threaded aperture 262 in which the shank end of an electrically conductive bolt 264 is threadably engaged. The bail 84a, as well as the strap 258 and block 260, are provided with an electrically insulating and chemically resistant protective coating 98a to prevent corrosive attack of these components by the acidic and alkaline solutions in which the plating barrel is to be immersed.

Three arcuately and circumferentially extending contacts 266 are securely fastened to the inner surface of the container 74a by means of the bolts 264 and are preferably mounted on a resilient insulating gasket 268 such as a neoprene gasket, for example. The arcuate contacts 266 extend through an angularity of about 120° such that the ends thereof are adjacent to each other forming a substantially continuous segmented ring, as may be best seen in FIGURE 10. In accordance with this arrangement, a substantially continuous electrically charged contact surface is provided around the interior of the barrel adjacent to the bottom panel 76a thereof, assuring continuous and intimate electric contact with the workpieces contained therein.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A conveying machine comprising a rail, a plurality of work carriers movably mounted on said rail, means for advancing said carriers along said rail, each of said carriers comprising a first frame, a second frame movably and guidably mounted on said first frame, a third frame pivotally mounted on said second frame, a workpiece container rotatably mounted on said third frame for rotation about an axis disposed in a plane angularly intersecting the axis of pivoting movement of said third frame, coacting means on said first and second frame, drive means connected to said container, and power means drivingly coupled to said coacting means and said drive means for moving said second frame up and down along said first frame and for rotating said container.

2. A conveying machine comprising a rail, a plurality of work carriers movably mounted on said rail, means for advancing said carriers along said rail, each of said carriers comprising a first frame, a second frame movably and guidably mounted on said first frame, a third frame pivotally mounted on said second frame, a workpiece container rotatably mounted on said third frame for rotation about an axis disposed in a plane substantially perpendicular to the axis of pivoting movement of said third frame, coacting means on said first and second frame, drive means connected to said container, and power means drivingly coupled to said coacting means and said drive means for moving said second frame up and down along said first frame and for rotating said container.

3. A conveying machine comprising a rail, a plurality of work carriers movably mounted on said rail, means for advancing said carriers along said rail, each of said carriers comprising a first frame, a second frame movably and guidably mounted on said first frame, a third frame pivotally mounted on said second frame, a workpiece container rotatably mounted on said third frame for rotation about an axis disposed in a plane angularly intersecting the axis of pivoting movement of said third frame, coacting means on said first and second frame, drive means connected to said container, and reversible power means supported by said second frame and drivingly coupled to said coacting means and said drive means operative when driving in one direction for moving said second frame and said container thereon from a raised position to a lowered position and for concurrently rotating said container, said reversible power means operative when driving in the opposite direction for moving said second frame and said container thereon from said lowered position to said raised position and for concurrently rotating said container during the ascending movement thereof.

4. A conveying machine comprising a rail, a plurality of work carriers movably mounted on said rail, means for advancing said carriers along said rail, each of said carriers comprising a first frame, a second frame movably and guidably mounted on said first frame, a third frame pivotally mounted on said second frame, a workpiece container rotatably mounted on said third frame for rotation about an axis disposed in a plane angularly intersecting the axis of pivoting movement of said third frame, coacting means on said first and second frame, drive means connected to said container, power means drivingly coupled to said coacting means and said drive means for moving said second frame up and down along said first frame and for rotating said container, and means on said machine operable for engaging and tilting said third frame and said container thereon from an operating position to a dump position angularly spaced therefrom.

5. A conveying machine comprising a frame, a rail on said frame, a plurality of work carriers movably mounted on said rail, means for advancing said carriers along said rail, each of said carriers comprising a first frame, a second frame movably and guidably mounted on said first frame, a third frame pivotally mounted on said second frame, a workpiece container formed with an open end rotatably mounted on said third frame for rotation about an axis disposed in a plane angularly intersecting the axis of piovting movement of said third frame, coacting means on said first and second frame, drive means connected to said container, reversible power means supported by said second frame and drivingly coupled to said coacting means and said drive means for moving said second frame up and down along said first frame and for rotating said container, stop means on said second and said third frame for normally maintaining said third frame and said container thereon in an operating position wherein said open end of said container is disposed upwardly, and means on said frame for engaging and tilting said third frame and said container from said operating position to a dump position wherein said open end of said container is disposed downwardly for discharging the contents thereof.

6. A conveying machine comprising a frame, a rail on said frame, a plurality of work carriers movably mounted on said rail, means for advancing said carriers along said rail, each of said carriers comprising a first frame, a second frame movably and guidably mounted on said first frame, a third frame pivotally mounted on said second frame, a workpiece container formed with an open end rotatably mounted on said third frame for rotation about an axis disposed in a plane angularly intersecting the axis of pivoting movement of said third frame, coacting means on said first and second frame, drive means connected to said container, reversible power means supported by said second frame and drivingly coupled to said coacting means and said drive means for moving said second frame up and down along said first frame and for rotating said container, stop means on said second and said third frame for normally maintaining said third frame and said container thereon in an operating position in which said open end of said container is disposed upwardly, unloading means on said frame for engaging and tilting said third frame and said container thereon from said operating position to an unloading position in which said open end of said container is disposed downwardly for discharging the contents thereof, and receiving means on said unloading means and movable thereby to receive the contents discharged from said container when in said unloading position.

7. A conveying machine comprising a frame, a rail on said frame, a plurality of work carriers movably mounted on said rail, means for intermittently advancing said carriers along said rail, each of said carriers comprising a first frame, a second frame movably and guidably mounted on said first frame, a third frame pivotally mounted on said second frame, a workpiece container formed with an open end rotatably mounted on said third frame for rotation about an axis disposed in a plane angularly intersecting the axis of pivoting movement of said third frame, coating means on said first and second frame, drive means connected to said container, reversible power means supported by said second frame and drivingly coupled to said coacting means and said drive means for moving said second frame up and down along said first frame and for rotating said container, said third frame and said container normally positioned by gravity in an operating position in which said axis of rotation of said container is angularly disposed from the horizontal and with said open end positioned upwardly, and unloading means on said frame including engaging means movable to and from an elevated position and a lowered position for engaging and tilting said third frame to and from said operating position and an unloading position in which said axis of rotation of said container is angularly disposed from the horizontal with said open end positioned downwardly for discharge of the contents thereof, and an unloading chute connected to and movable with said engaging means for receiving the contents discharged from said container.

8. In a work carrier for immersing workpieces in a treating receptacle, the combination comprising a first frame, a second frame movably and guidably mounted on said first frame, a third frame pivotally mounted on said second frame, a workpiece container rotatably mounted on said third frame for rotation about an axis disposed in a plane angularly intersecting the axis of pivoting movement of said third frame, coacting means on said first and said second frames, drive means connected to said container, and power means drivingly coupled to said coacting means and said drive means for moving said second frame up and down along said first frame and for rotating said container.

9. In a work carrier for immersing workpieces in a treating receptacle, the combination comprising a first frame, a second frame movably and guidably mounted on said first frame, a third frame pivotally mounted on said second frame, a workpiece container formed with an open end rotatably mounted on said third frame for rotation about an axis disposed in a plane substantially perpendicular to the axis of pivoting movement of said third frame, coacting means on said first and said second frames, drive means connected to said container, and power means drivingly coupled to said coacting means and said drive means for moving said second frame up and down along said first frame and for rotating said container.

10. In a work carrier for immersing workpieces in a treating receptacle, the combination comprising an upright first frame, a second frame guidably mounted on said first frame for up and down movement thereon, a third frame pivotally mounted on said second frame, a workpiece container assembly rotatably mounted on said third frame for rotation about an axis disposed in a plane angularly intersecting the axis of pivoting movement of said third frame, coating means on said first and said second frame, a shaft on said second frame extending along the axis of pivoting movement of said third frame, reversible motor means supported on said second frame drivingly coupled in response to rotation thereof in one direction to said coacting means and to said shaft for movement of said second frame upwardly along said first frame and for rotation of said shaft, and coupled in response to rotation thereof in the opposite direction to said shaft for rotating said shaft and permitting controlled gravitational descent of said second frame relative to said first frame by said coacting means; and drive means drivingly coupled to said shaft and said container assembly in all tilted positions thereof for rotating said container assembly in response to rotation of said shaft.

11. In a work carrier for immersing workpieces in a treating receptacle, the combination comprising an upright first frame, a second frame guidably mounted on said first frame for up and down movement thereon, a third frame pivotally mounted on said second frame, a workpiece container assembly rotatably mounted on said third frame for rotation about an axis disposed in a plane angularly intersecting the axis of pivoting movement of said third frame, coacting means on said first and said second frame, a first shaft on said second frame extending along the axis of pivoting movement of said third frame, reversible motor means supported on said second frame drivingly coupled in response to rotation thereof in one direction to said coacting means and to said first shaft for movement of said second frame upwardly along said first frame and for rotation of said first shaft, and coupled in response to rotation thereof in the opposite direction to said first shaft for rotating said first shaft and permitting controlled gravitational descent of said second frame relative to said first frame by said coacting means; a second shaft rotatably mounted on said third frame, gear means on said first and said second shaft disposed in mutual constant meshing relationship in all tilted positions of said third frame, and means drivingly connecting said second shaft to said container assembly for rotation thereof in response to rotation of said first shaft.

12. In a work carrier for immersing workpieces in a treating receptacle, the combination comprising an upright first frame, a second frame guidably mounted on said first frame for up and down movement thereon, a third frame pivotally mounted on said second frame, a workpiece container assembly rotatably mounted on said third frame for rotation about an axis disposed in a plane angularly intersecting the axis of pivoting movement of said third frame, coacting means on said first and said second frame, a first shaft on said second frame extending along the axis of pivoting movement of said third frame, reversible motor means supported on said second frame drivingly coupled in response to rotation thereof in one direction to said coacting means and to said first shaft for movement of said second frame upwardly along said first frame and for rotation of said first shaft, and coupled in response to rotation thereof in the opposite direction to said first shaft for rotating said first shaft and permitting controlled gravitational descent of said second frame relative to said first frame by said coacting means; a second shaft rotatably mounted on said third frame, a first gear on said first shaft, a second gear on said second shaft disposed in constant meshing relationship with said first gear in all tilted positions of said third frame, a first rotatable element on said second shaft, a second rotatable element on said container assembly, and a flexible element drivingly coupling said first and second rotatable element to each other for rotation of said container assembly in response to rotation of said first shaft.

13. In a work carrier for immersing workpieces in a treating receptacle, the combination comprising an upright first frame, a second frame guidably mounted on said first frame for up and down movement thereon, a third frame including a pair of spaced depending leg members pivotally mounted on said second frame, a workpiece container assembly rotatably mounted on and extending between said leg members for rotation about an axis disposed in a plane substantially perpendicular to the axis of pivoting movement of said third frame, coacting means on said first and said second frame, a first shaft on said second frame extending along the axis of pivoting movement of said third frame, reversible motor means supported on said second frame drivingly coupled in response to rotation thereof in one direction to said coacting means and to said first shaft for movement of said second frame upwardly along said first frame and for rotation of said first shaft, and coupled in response to rotation thereof in the opposite direction to said first shaft for rotating said first shaft and permitting controlled gravitational descent of said second frame relative to said first frame by said coacting means; a second shaft rotatably mounted on said third frame and disposed substantially parallel to the axis of rotation of said container assembly, a first bevel gear on said first shaft, a second bevel gear on said second shaft disposed in constant meshing relationship with first gear in all tilted positions of said third frame, and means driving connecting said second shaft to said container assembly for rotation thereof in response to rotation of said first shaft.

14. In a work carrier for conveying workpieces through an electroplating operation, the combination including a frame, a workpiece container assembly rotatably mounted on said frame, and means for rotating said container assembly, said container assembly comprising a barrel including a side wall and one end wall defining a chamber open at one end thereof, at least the surfaces of said barrel formed of an electrically nonconductive material and including perforations therethrough for passage of an electroplating solution, a supporting frame including a plurality of electrically conductive members affixed at circumferentially spaced intervals around the periphery of said barrel and connected at the other ends thereof to an electrically conductive hub member disposed adjacent to the open end of said barrel, said hub member disposed with the axis thereof in axial alignment with the longitudinal axis of said barrel, means for rotatably mounting said hub member in electrically insulated relationship on said frame, contact means on said frame disposed in electrical sliding contact with said hub member, and work contact means electrically connected to said electrically conductive members and projecting inwardly into the interior of said barrel.

15. In a work carrier for conveying workpieces through an electroplating operation, the combination including a frame, a workpiece container assembly rotatably mounted on said frame, and means for rotating said container assembly, said container assembly comprising a barrel including a side wall and one end wall defining a chamber open at one end thereof, at least the surfaces of said barrel formed of an electrically nonconductive material and including perforations therethrough for passage of an electroplating solution, a supporting frame including a plurality of electrically conductive members affixed at circumferentially spaced intervals around the periphery of said barrel and connected at the other ends thereof to an electrically conductive hub member disposed adjacent to the open end of said barrel, said hub member disposed with the axis thereof in axial alignment with the longitudinal axis of said barrel, said hub member formed with an aperture extending axially therethrough defining a nozzle for discharging fluids into the interior of said barrel, means for rotatably mounting said hub member in electrically insulated relationship on said frame, contact means on said frame disposed in electrical sliding contact with said hub member, and work contact means electrically connected to said electrically conductive members and projecting inwardly into the interior of said barrel.

16. In a work carrier for conveying workpieces through an electroplating operation, the combination including a frame, a workpiece container assembly rotatably mounted on said frame, and means for rotating said container assembly, said container assembly comprising a barrel including a side wall and one end wall defining a chamber open at one end thereof, at least the surfaces of said barrel formed of an electrically nonconductive material and including perforations therethrough for passage of an electroplating solution, a supporting frame including a plurality of electrically conductive members affixed at circumferentially spaced intervals around the periphery of said barrel and connected at the other ends thereof to an electrically conductive hub member disposed adjacent to the open end of said barrel, said hub member disposed with the axis thereof in axial alignment with the longitudinal axis of said barrel, means for rotatably mounting said hub member in electrically insulated relationship on said frame, contact means on said frame disposed in electrical sliding contact with said hub member and work contact means electrically connected to each of said electrically conductive members including a head portion projecting inwardly into the interior of said barrel at circumferentially and axially spaced increments therearound for electrifying the workpieces therein.

17. In a work carrier for conveying workpieces through an electroplating operation, the combination including a frame, a workpiece container assembly rotatably mounted on said frame, and means for rotating said container assembly, said container assembly comprising a barrel including a side wall and one end wall defining a chamber open at one end thereof, at least the surfaces of said barrel formed of an electrically nonconductive material and including perforations therethrough for passage of an electroplating solution, a supporting frame including a plurality of electrically conductive members affixed at circumferentially spaced intervals around the periphery of said barrel and connected at the other ends thereof to an electrically conductive hub member disposed adjacent to the open end of said barrel, said hub member disposed with the axis thereof in axial alignment with the longitudinal axis of said barrel, means for rotatably mounting said hub member in electrically insulated relationship on said frame, contact means on said frame disposed in electrical sliding contact with said hub member and work contact means comprising a series of arcuate segments disposed in end to end circumferential alignment around the interior surface of said barrel and electrically connected to said electrically conductive members.

References Cited

UNITED STATES PATENTS 3,382,844   5/1968   Kumpf _____ 118—418 XR

JOHN H. MACK, *Primary Examiner.*

W. VAN SISE, *Assistant Examiner.*

U.S. Cl. X.R.

204—201, 214; 134—77; 118—418; 214—89